United States Patent [19]

Bell, Jr. et al.

[11] 4,002,885
[45] Jan. 11, 1977

[54] SERVO FEED SYSTEM FOR A WIRE ELECTRODE TYPE ELECTRICAL DISCHARGE MACHINING APPARATUS

[75] Inventors: Oliver A. Bell, Jr., Mooresville; Randall C. Gilleland, Statesville, both of N.C.

[73] Assignee: Colt Industries Operating Corporation, New York, N.Y.

[22] Filed: Feb. 21, 1975

[21] Appl. No.: 551,957

[52] U.S. Cl. ............... 219/69 G; 219/69 W; 235/151.11; 318/571
[51] Int. Cl.² ..................................... B23P 1/08
[58] Field of Search ............ 219/69 W, 69 G, 69 C, 219/69 V; 235/151.11; 318/571, 565, 592, 595

[56] References Cited
UNITED STATES PATENTS

| | | | |
|---|---|---|---|
| 3,475,578 | 10/1969 | Vasiliev et al. | 219/69 V |
| 3,525,843 | 8/1970 | Batterson | 219/69 G |
| 3,531,615 | 9/1970 | Zammit | 219/69 G |
| 3,633,013 | 1/1972 | Dummermuth | 318/571 X |
| 3,793,511 | 2/1974 | Bala et al. | 235/151.11 |
| 3,825,713 | 7/1974 | Bell | 219/69 G |
| 3,832,511 | 8/1974 | Bell et al. | 219/69 C |
| 3,855,443 | 12/1974 | Bell et al. | 219/69 G |
| 3,878,761 | 4/1975 | Makowski | 318/571 X |

*Primary Examiner*—Bruce A. Reynolds
*Attorney, Agent, or Firm*—Harry R. Dumont

[57] ABSTRACT

The system includes a pair of stepping motors for controlling relative movement of the wire electrode relative to the workpiece with the velocity of movement being controlled as a function of gap voltage. For this purpose the system includes a voltage controlled oscillator having its input coupled to the machining gap and its output interconnected with the drive circuits for the two stepping motors. The system further includes a divider stage which becomes operable in the system responsive to drop of voltage indicating gap short circuit condition so that a drastically reduced number of stepping pulses are provided to the motors throughout the duration of the gap short circuit condition. After removal of the gap short circuit condition, an increase in voltage allows changeover through several different gating stages to again return the output of the voltage controlled oscillator to its normal frequency range so that the feed of the electrode relative to the workpiece is again continued.

20 Claims, 4 Drawing Figures

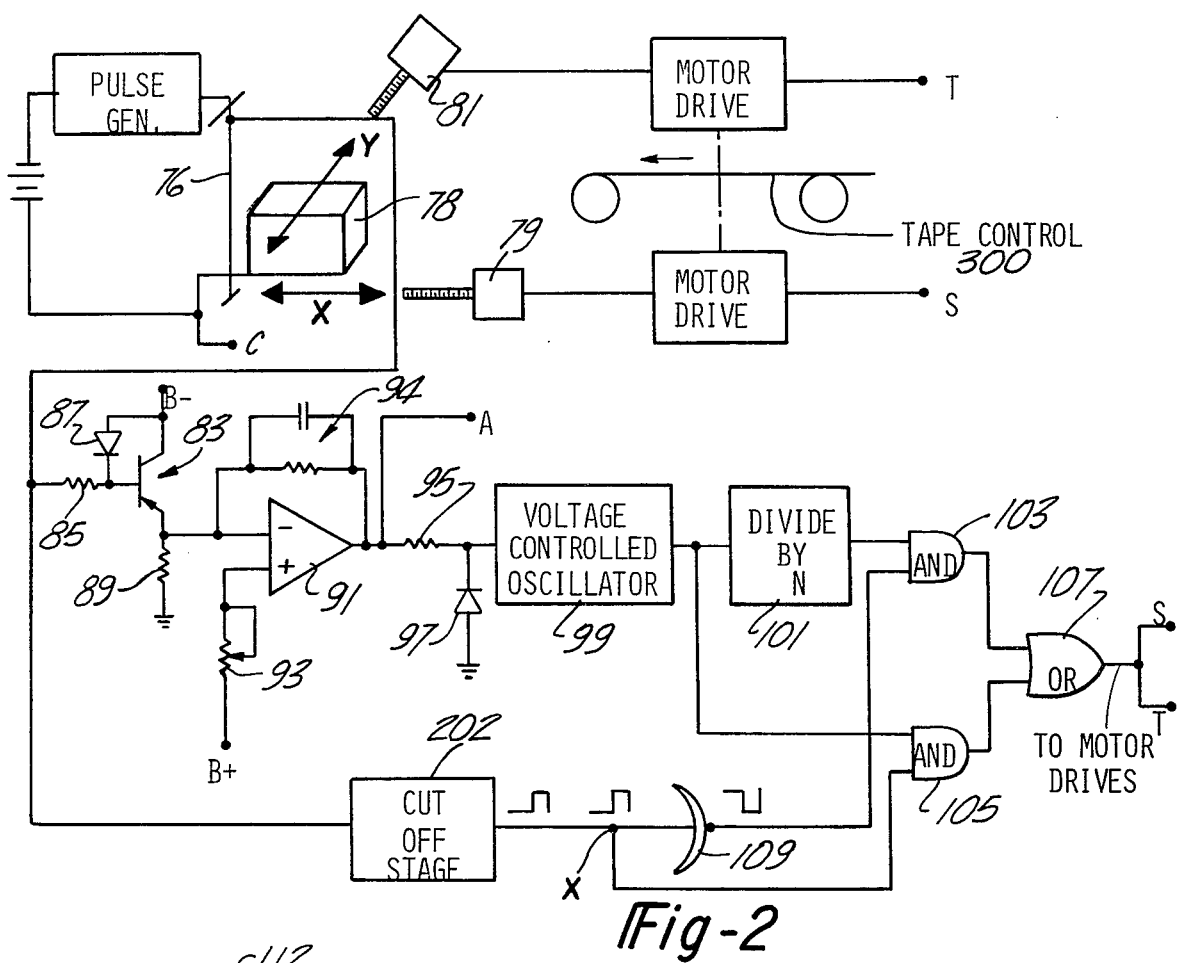
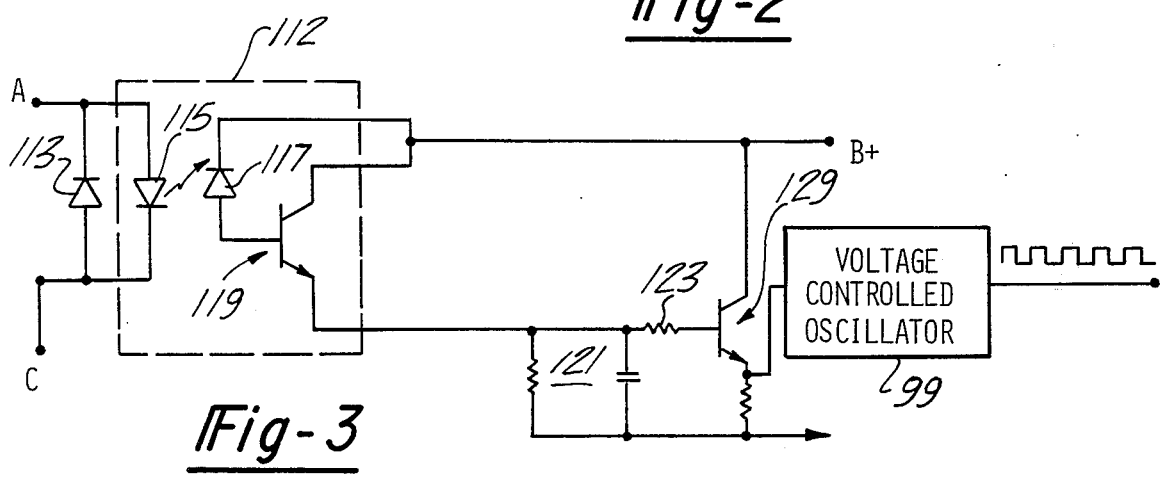
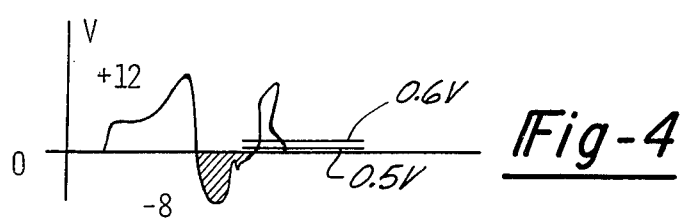

SERVO FEED SYSTEM FOR A WIRE ELECTRODE TYPE ELECTRICAL DISCHARGE MACHINING APPARATUS

REFERENCE TO RELATED PATENT

The present application is related to and adapted for use with the electrical discharge machining power supply shown and described in our U.S. Pat. No. 3,855,443 issued on Dec. 17, 1974 and of common ownership with the present application.

BACKGROUND OF THE INVENTION

The present invention relates to a novel and improved servo feed system, particularly adapted for use in a wire cutting type electrical discharge machining operation. When there occurs the condition known as "gap short circuit condition", such as when there is contact or pending contact between the wire electrode and the workpiece or bridging of particles between those elements, it is necessary to perform one or both of the following operations. Machining current should be interrupted or substantially reduced pending resumption of normal machining, or servo feed control should be maintained to stop the advance of the workpiece relative to the electrode until the condition is alleviated. With wire electrode cutting where the path is frequently curvilinear or around sharp corners, it is not possible to provide an appreciable backup as between the electrode and the workpiece without further complicating the problem. Other types of wire electrode servo feed arrangements are known which provide the retracing of wire paths for a predetermined distance and then resumption of forward servo feed when gap short circuit is alleviated.

The present invention, as it will be seen to operate, provides an improved servo feed system which operates in such manner that the retracing of the prior cutting path is rendered unnecessary through the appropriate control exercised over the frequency of stepping pulses provided to the stepping motor or motors used in the system.

The present invention is particularly adaptable for use with those embodiments of electrical discharge machining power supplies in which the pulse generator, drive stage and output switches are transistors or other electronic switches, and in which the pulse generator is of the independent operating type, such as a multivibrator, oscillator or the like. While transistors are employed as the electronic switches in the preferred embodiment, the present invention is not limited to use in conjunction with such switches. By "electronic switch," we mean any electronic control device having a plurality of electrodes comprising at least two principal or power conducting electrodes acting to control the current flow in the power circuit, the conductivity of the power circuit being controlled by a control electrode within the switch, whereby the conductivity of the power circuit is regulated statically or electrically without the movement of any mechanical elements within the switch. Included within this definition by way of illustration, but not limitation, are vacuum tubes, transistors, semi-conductor control rectifiers, and the like.

Various prior art gap short circuit protection systems have been developed which provide for reduction of the machining current responsive to abnormal gap condition. An example of such a short circuit protection system is disclosed in our above mentioned U.S. Pat. No. 3,855,443. The system which is described in that patent is one which, responsive to a gap short circuit condition, lengthens the off-time and allows a predetermined series of pulses to be applied to the gap. The pulses provided to the gap during the gap short circuit condition are of the normal machining pulse on-off time and frequency. A series of pulses are thus applied and are then followed by a lengthened off-time interval several times the duration of the off-time of the first series. The system includes means for providing and presetting the number of the series of pulses which will be passed during the gap short circuit condition.

In a wire cutting apparatus, it has been found to be advantageous during the period of gap short circuit not only to reduce the current being provided to the gap but further to immediately influence and control the servo feed system by circuitry and means which are included in connection with the teachings of the present invention.

BRIEF SUMMARY OF THE INVENTION

The present invention will be seen to relate to a servo feed system which affects the feed of a workpiece relative to a wire electrode having almost immediate response to a gap short circuit condition in such manner as to virtually stop the advance of the workpiece relative to the wire electrode. The system includes a controlled oscillator which provides feed pulses to the servo feed system drive motors with a feed rate which is the function of gap voltage so that there is provided appropriate control of the feed rate as machining normally progresses. In order to accommodate the situation when gap short circuit condition occurs yet without requiring backup or retracing of the cutting path, there is included in the servo feed system a divide-by-N presettable stage which during the continuation of gap short circuit condition will drastically reduce the number of stepping pulses being provided to the servo feed motors. To this end, there is included in the system a cut-off stage responsive to gap short circuit which enables passage of a drastically reduced number of pulses from the divide-by-N stage to slow the rate of advance for the continuation of the gap short circuit condition. As soon as the gap short circuit voltage level is removed, a changed output from the cut-off stage disconnects the pulse output from the divide-by-N stage to the motor drive circuit and instead provides the normal pulse output of the voltage controlled oscillator to the motor drive circuits. To provide this mode of operation, there is provided an inverter intermediate the output from the cut-off stage and a first AND gate input, while there is provided a second AND gate input coupled to the output of the cut-off stage. Both AND gates above mentioned have their outputs connected to a pair of OR gate inputs, which OR gate then controls the pulse output to the motor drive circuits.

A further feature of the invention includes a gap sensing network for the normal servo feed operation having an opticoupling network which makes possible greatly improved servo feed, particularly when multiple gaps are involved or when one pulse generator power supply is used to feed a number of different electrical discharge machining machine tools, each having an independent gap cutting operation.

BRIEF DESCRIPTION OF THE DRAWINGS

The present invention, its operation, features and advantages, and the advancements which it affords will be understood stood from the following specification, together with the drawings in which like numerals are used to refer to similar or like parts where they occur, and wherein:

FIG. 2 is a combined schematic, block diagrammatic showing of the basic operating elements from the FIG. 1 circuit and the remaining elements of the servo feed system as they are used to control the relative movement between the wire electrode and the workpiece;

FIG. 3 is a schematic, block diagrammatic showing of a particular opticoupling network which is useful as one alternate embodiment in the present invention; and FIG. 4 is a voltage waveform diagram which assists in clarifying the mode of operation of the present invention.

DETAILED DESCRIPTION OF THE PREFERRED EMBODIMENT

Figure 1:
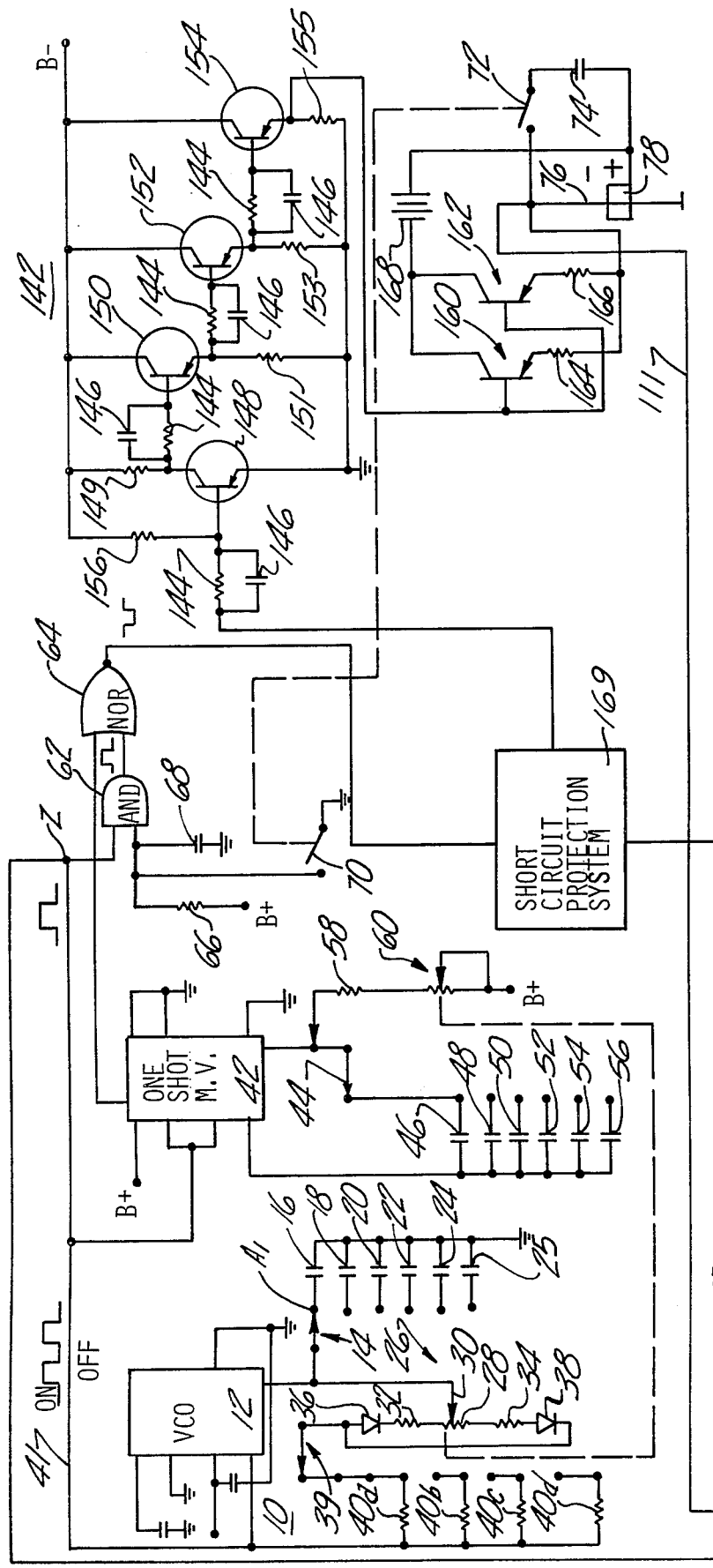
FIG. 1 is a combined schematic and block diagrammatic showing of the invention showing the detail of the electrical discharge machining power supply, the cut-off stage, and the gap sensing circuit involved.

The present invention will be explained with relationship to an electrical discharge machining power supply that has in it two different pulse generators, one operable during normal cutting operation and with variable and controllable on-off time ratio or duty factor. The second pulse generator is operated in phase with the first but used to provide pulses of a substantially limited duty factor, particularly during finishing operation that is conducted in the gap capacitor mode. These two different modes of operation and the manner in which the circuits operate are shown and described in our U.S. Pat. No. 3,832,511, for "Short Circuit Protection System for Electrical Discharge Machining Apparatus" issued on Aug. 27, 1974.

The first of the two pulse generators included in the power supply apparatus is indicated generally by the numeral 10 and includes a voltage controlled oscillator 12 which provides at point "$A_1$" a sawtooth voltage waveform output. A capacitor tap switch 14 is included in the circuit to selectively connect one of a plurality of different magnitude capacitors 16–25 in the circuit. The on-off time control portion of the generator 10 includes a rheostat 26 having a variable resistor 28 and a movable contact slider 30. A pair of current limiting resistors 32 and 34 are included in the circuit in series with the resistor 28 and a pair of diodes 36 and 38, respectively. A further tap switch 39 is also included for adding into the circuit a selected one of a plurality of different value resistors 40a–40d. The first pulse generator 10 is typically operable over a wide range of duty factors between 1% and 99%.

The second of the two pulse generators includes a retriggerable one-shot multivibrator 42 which is coupled to the output of the multivibrator 10. It will be understood that the oscillator 12 and the one-shot multivibrator 42 are preferably embodied as integrated circuits now commercially available. An example of one voltage controlled oscillator suitable for use with the present invention is included in Model SE/SN 567 currently commercially available from the Signetics Company of 811 Arques Avenue, Sunnyvale, Cal. One type of a retriggerable monostable multivibrator or one-shot multivibrator, which is likewise commercially available for use in connection with the power supply, is Model N74122 available from the aforementioned Signetics Company.

In a like manner to the first multivibrator 10, the one-shot multivibrator 42 includes a selectively variable resistor-capacitor network which comprises a tap switch 44 and a plurality of different magnitude capacitors 46–56 selectively switchable into the circuit to control the pulse frequency of the output from the one-shot multivibrator 42. At the right side of the resistor-capacitor network, there is included a series resistor 58 and a rheostat 60 for presetting the on-off time of operation of the one-shot multivibrator 42. It will be understood that the duty factor of the one-shot multivibrator 42 is normally limited to a value of the order of 30% of the maximum on-time available. This is done to insure that during the gap capacitor mode of machining there will be provided an adequate time for the triggering of the output switches 160 and 162 and for charge and discharge of the gap capacitor 74 without resultant DC arcing or gap short circuiting.

The next following stages in the power supply circuit are an AND gate 62 and a NOR gate 64. An external resistor-capacitor timing network is provided for the AND gate 62 that includes a resistor 66 and a capacitor 68. The output from the pulse generator 10, with the exemplary on-off times indicated, is shown at the upper lead 41 at the left side of the FIG. 1 drawing. This signal is provided as one input to the AND gate 62. Switch 70 is shown with its movable contact in an open position between the lower of the two inputs to the AND gate 62 and ground. A second switch 72 is shown connected intermediate the gap capacitor 74 and the gap. The capacitor 74 is switched across the machining gap between the wire electrode 76 and the workpiece 78 during the above described capacitor mode of operation. It will be understood that for wire electrode electrical discharge machining cutting, relatively high voltage machining is frequently found to be of advantage so that machining in the gap capacitor mode is preferred. A dash line is included in the drawing to indicate the ganged operation of the two switches 70 and 72. It will be understood that this conjoint operation between the two switches 70 and 72, which occurs during switching changeover between the regular and the gap capacitor mode of operation, could as readily be achieved by including in the circuit a relay arrangement in which the activation of one switch initiates the operation of another circuit.

With respect to the NOR gate 64, it will be seen that it receives as its two signal inputs the output from the one-shot multivibrator 42 and the output from the AND gate 62. The description of operation of the two multivibrators 10 and 42 and of the AND gate 62 and the NOR gate 64 will be given in the later section entitled "Description of Operation."

An intermediate drive stage is included in the power supply circuit which is indicated generally by the numeral 142. The drive stage 142 includes an input network having a base resistor 144 and a parallel capacitor 146. Four separate amplifier stages are included in the drive stage 142, with the first including a transistor 148 connected in a common emitter stage, and the next three stages including transistors 150, 152 and 154, all being emitter follower stages. Parallel RC signal networks are also included in the input lead to each of the latter three stages. Each such signal network includes a capacitor 146 and a resistor 144. Three separate emitter resistors 151, 153 and 155 are included in the circuit as shown.

In the first stage, including the transistor 148 and its collector resistor 149, the transistor 148 is biased on by a resistor 156. The signal output from the final emitter follower stage, including the transistor 154, is used to control the operation of a pair of transistor output switches 160 and 162. It can be seen that the output switches 160 and 162 are parallel coupled and further connected in series between a main DC power source 168 and the machining gap which, as already described, includes a wire electrode 76 and a workpiece 78 with the plus and minus polarity as shown. The gap itself as embodied with a wire cutting setup is shown in somewhat greater detail in FIG. 2 hereinafter. It will be understood that, while two output transistors are shown in the circuit in accordance with the particular power requirement for the power supply, a single transistor or a much greater number of transistors may be coupled to provide the necessary machining current magnitude.

In the normal operation of an electrical discharge machining power supply in response to the turn-on and the turn-off of the output switches 160 and 162, machining power pulses will be provided across the gap. The power supply may also include a short circuit protection system 169 shown in block diagrammatic form. One example of a suitable short circuit protection system is disclosed in detail in our aforementioned U.S. Pat. No. 3,855,443 and shown in detail in FIG. 1 of that patent. In the interest of brevity, the complete detail of that system is not repeated in the present application.

The present invention includes a cut-off stage and gap sensing circuit denoted generally by the numeral 202. Included in the gap sensing circuit 202 is an FET transistor 210. The FET transistor 210 includes a series resistor 212 connected intermediate its gate and the negative terminal of the gap at the wire electrode 76. Also associated with the FET transistor 210 is a load resistor 214 and a potentiometer 216 connected to back bias the FET 210. The sensing circuit further includes a pair of one-shot multivibrators 220 and 222, and an inverter 224 having its inverted output connected to the clear terminal of a dual D-type, edge triggered flip-flop 226. A pair of following series connected inverter stages 228 and 230 are connected between the $\overline{Q}$ output of the one-shot multivibrator 222 and point X which provides the input for the gating stages of the servo control circuit as will be shown in FIG. 2. It will be appreciated that there is alternately available an output from the second inverter 230 which also serves to control the operation of the short circuit protection system 169 as described in our aforementioned U.S. Pat. No. 3,855,443. The major attention in the present application is being directed to the servo feed invention. The one-shot multivibrator stages 220 and 222 have associated with each a different time constant network 221, 223, respectively, as shown. A cut-off signal of the logical 1 level is thus available from the inverter 230 whenever gap short circuit condition occurs as will be further described and explained in the "Description of Operation" hereinafter.

The preferred embodiment is not limited to any particular type of integrated circuitry, such as TTL logic elements or DTL logic elements. Integrated circuits are generally desirable in the interest of reducing the complexity of circuitry, increasing its reliability and further reducing the power requirements for the control system's circuitry.

FIG. 2 shows the basic operating elements of the servo feed control system which include the pulse generator and cut-off stage shown in their entirety in FIG. 1, the wire electrode 76 and the workpiece 78. In the preferred embodiment of the present invention, the workpiece 78 is supported by a work table movable in both the X and Y axes through the operation of a pair of orthogonally placed electrical stepping motors 79 and 81, each through a lead screw coupled to the workpiece table (not shown). Responsive to the receipt of stepping pulses at the terminals T and S, the two drive motors 81, 79 are moved in the appropriate direction with respect to the vertically aligned wire electrode 76. A numerical control unit with tape control is typically used to control the direction of table movement. Reference is made to copending application Ser. No. 534,292 filed on Dec. 19, 1974 for "Electronic Alignment System for Wire Electrode", which is of common ownership with the present application. This application shows the manner in which the workpiece may be supported for movement in two axes on a movable table with a transversely moving wire electrode which is appropriately supported in a vertical direction on the machine tool head. While the preferred embodiment is illustrated with respect to a setup in which the workpiece 78 is movable and the wire electrode 76 is fixed, with an appropriate reversal of the parts, it is possible within the skill of one knowing the art to have a movably supported electrode incrementally advanced with respect to a stationary workpiece.

Also included in the drawing of FIG. 2 is a transistor 83 which has its base connected through a signal resistor 85 to the negative gap terminal. A protective diode 87 is connected across the base connector junction of the transistor 83 and a series resistor 89 is connected between the emitter and ground. The circuit includes a next following differential amplifier 91 having one input terminal connected to the signal output of the transistor 83. A variable reference voltage is provided to the other input terminal of the differential amplifier 91 through a potentiometer 93. An external RC timing network 94 is further associated with the differential amplifier 91. Next connected in the path of the output from the differential amplifier 91 are a series resistor 95 and a clipping diode 97 which rectifies the output from the amplifier 91. A voltage controlled oscillator 99 is further included in the circuit. The voltage controlled oscillator 99 may be one of several readily available commercial types in which the output frequency is dependent on and proportional to the magnitude of a voltage input signal. In this manner, it is possible to provide an output to the electrical servo stepping motors 79 and 81 through their motor drive circuits which control their feed rate in accordance with the magnitude of gap voltage being sensed through the sensing network.

The servo control system next includes a divide-by-N stage or divider stage 101. The divide-by-N stage may be embodied as high speed counters of the TTL type also well known and commercially available in the art. A pair of AND gates 103 and 105 and an OR gate 107 next follow in the system, with the output of the OR gate 107 being provided through terminals S and T to the two motor drive circuits for the electrical stepping motors 79, 81.

Also included in the servo feed system is a cut-off stage 202 which is shown in its detail in FIG. 1. The description of operation of the cut-off stage 202 and its significance in providing a control pulse for the servo feed system will further be explained in the "Description of Operation". A final inverter stage 109 is included in the system intermediate the output of the cut-off stage 202 at point X and the lower input terminal of the AND gate 103. A branch circuit is also connected between point X and the lower input terminal for the AND gate 105.

FIG. 3 illustrates an alternate embodiment of the gap sensing network which would ordinarily have its input connected across the terminals A and C as illustrated in connection with FIG. 2. An opticoupling network 112 is shown with the input taken across the first diode 113. The opticoupling network 112 further includes a light emitting diode 115 and a light responsive stage including diode 117 and photo-transistor 119. Responsive to fluctuations in current flow through the diode 115, its light output is passed to the light responsive stage to control the conduction of the following photo-transistor 119. The pulse shaping network 121 and series resistor 123 are connected in the input to a following transistor 129 with the signal output to the voltage controlled oscillator 99 being taken from the emitter of the transistor 129. The output finally provided from the voltage controlled oscillator 99 is a pulse output whose frequency is controlled in dependence upon the variations occurring in gap voltage.

FIG. 4 is a voltage waveform illustrating gap voltage excursions which normally occur during machining and the voltages across points A and C, which may range between plus 12 and minus 8 volts, for example.

DESCRIPTION OF OPERATION

With reference to FIG. 1, the operation of the power supply circuit is started by the output from the voltage controlled oscillator VCO 12 which has been preset to one of the capacitors through the positioning of the switch 14. The voltage $^{V}A_1$ is of a sawtooth waveform and represents the voltage excursions occurring on the particular capacitor switched in by the setting of the switch 14. The on-time is increased by moving the movable contact slider 30 of the potentiometer 26 downwardly. This increases the portion of the resistor 28 which is in circuit in the charge path for the capacitor 16. At the same time, the resistance of the resistor 28 in series with the resistor 32 and in the discharge path for the capacitor 16 is decreased, thus decreasing the off-time. The combined resistance of the resistors 40a, 40b, 40c, 40d, 32 and 34, thus serves to provide a limit to the maximum and minimum on-off time periods available during normal machining operation. By the adjustment of the rheostat 26 it is possible to inversely vary the machining pulse on and off time without changing the frequency already preset by the capacitor tap switch 14. The output shown on the lead 41 includes an on-time portion and an off-time portion. It is then furnished as an input to the upper input terminal of the AND gate 62. An appropriate reference voltage signal is provided through the resistor 66 to the lower input terminal of the AND gate 62. This input allows the pulse input at the upper input terminal of the AND gate 62 to pass through. The duty cycle of the pulse at the lower input terminal of the NOR gate 64 is always the same or greater than the duty cycle of the pulse input to its upper input terminal. The NOR gate 64 will always pass the longest pulse and provide it as an output in inverted form.

When the operator switches the power supply over into the gap capacitor mode such as is frequently used in wire electrode cutting, the switch 72 is closed to connect the gap capacitor 74 across the machining gap. It will be understood that there is normally a bank of capacitors provided so that there is available a selection of different magnitude capacitors, for example through an appropriate tap switch arrangement. There exists a cooperative relationship between the phasing of the switches 70 and 72. As soon as the gap capacitor selecting switch 72 is closed, the switch 70 is likewise closed, thus grounding the lower input terminal of the AND gate 62 and causing the lower input terminal of the NOR gate 64 to stay at zero. In this condition, the pulse provided at the upper input terminal of the NOR gate 64 is allowed to pass through and to be inverted. Accordingly, during capacitor mode machining, there is provided a maximum duty factor triggering pulse of the order of 30% which is placed into operation for controlling the maximum conduction period of the output switches, transistors 160 and 162. Each of the pulses indicated along the lead 41 will be passed through the drive stage 142 and with normal gap operating conditions will initiate a gap breakdown.

The operation of the gap sensing network and cut-off stage 202 takes place within a predetermined time period slightly less than machining power pulse on-time. If the minus gap voltage sensed at the gate of FET transistor 210 returns to a negative level within that time period, it will be held off and normal cutting will continue and, of course, normal servo feed operation will likewise continue as will be made clear in connection with the description of FIG. 2.

During gap short circuit condition, the gap voltage level generally drops quite rapidly even in advance of gap hard short circuit so that there is given a preliminary indication of abnormal gap machining which sensing circuits are required to respond to in order to take corrective action. The sensing circuit comprises the lead 111 which is connected to the negative gap terminal, that is, to the terminal coupled to the wire electrode 76. The gap signal is passed through the series resistor 212 for sensing gap voltage. The gate of the FET 210 is reverse biased. If the gap voltage does return to the normal negative level, for example, of approximately 90 volts, the FET 210 is held off and provides an output signal to the inverter 224 which in turn applies a zero level signal to the clear input of the flip-flop 226. At the beginning of the pulse, the one-shot multivibrator 220 receives a pulse input from the multivibrator switch output on lead 41 at point Z. The time constant of operation of the one-shot multivibrator 220 is controlled by an external RC timing network 221 and is set to be somewhat less than the normal machining pulse on-time. Thus, the output from the one-shot multivibrator 220 is being applied to the C input of the flip-flop 226 and to the A input terminal of the one-shot multivibrator 222 for the time duration preset. If the FET 210 is triggered into operation, there will be provided a logical 1 output from the $\overline{Q}$ of the one-shot multivibrator 222 which is passed through the two following inverter stages 228, 230. Otherwise stated, if there is no clear signal provided from the FET 210, then there is provided a changeover signal in the servo control system as illustrated in FIG. 2.

FIG. 2 illustrates the mode of operation of the control circuit for the servo feed system with the cut-off stage 202 shown in block diagrammatic form and the waveforms illustrated as they are provided at point X and at the output of the inverter stage 109 represent the abnormal or gap short circuit condition. During the normal cutting condition, the output provided from the cut-off stage 202 is better clarified with reference to the FIG. 1 showing. With the FET triggered off, the output from the Q terminal of the one-shot multivibrator 222 is of the zero level and after passage through the inverter stages 228 and 230 it is likewise of the zero level. Thus, the lower AND gate 105 is enabled and the output of the voltage controlled oscillator 99 is passed through the lower AND gate 105 into the lower input for the OR gate 107 and the operation of the motors 79, 81 through their associated motor drive circuits are continued under the control of the tape control unit and the incremental drive indicia control recorded thereon to provide normal feed of the workpiece 78 in the X and Y axes.

When there are minor excursions in the gap voltage sensed at the base of the transistor 83, then there will be changes in frequency which appropriately change the feed rate in the X and Y axes as controlled by the motors 79, 81. However, when gap short circuit condition is impending or actually occurs, then the output from the cut-off stage, namely as shown at point X, changes to the logical 1 level with the pulses illustrated. Thus, the output from the inverter 109 is altered as shown so that the upper AND gate 103 is enabled and the divide-by-N output from the divider 101 is passed to the upper input terminal of the OR gate 107 so that the greatly reduced frequency control pulses are then communicated on to the terminals S and T of the motor drive circuits associated with the stepping motors 79, 81. Thus, for the continuation of the gap short circuit condition, extremely low frequency triggering pulses are provided to the stepping motors 79, 81.

With reference to the FIG. 4 voltage waveform diagram, it will be seen that due to the inclusion in the circuit of the clipping diode 97 the voltage excursions which normally would exist at the input to the VCO 99 between plus 12 and minus 8 volts are cut off so that only the plus voltage excursions occur. With a voltage controlled oscillator 99 capable of handling input voltages of the range of between 1 and 10 volts, there will, by way of example, occur a changeover in the window provided between plus 0.5 volts and plus 0.6 volts so that between these limits the operation of the feed table for the electrode 78 would stop. Once the voltage level at the gap exceeds the 0.6 voltage level, the operation of the table through the motors 79, 81, in accordance with the motor drive circuits and the tape control 300, would then be continued at the regular rate. However, during the time period that the gap short circuit voltage level is experienced above the dead zero limit and in the narrow window between, for example, 0.5 and 0.6 volts, there would occur pulses of a greatly reduced frequency so that the table would stop and indeed almost float into a static position for the continuation of the short circuit condition. For example, if the pulse rate of the voltage controlled oscillator 99 had dropped to a frequency of the order of 5 pulses per minute and if the divider 101 were to divide by a number N equal to 1000, then we would perhaps have only one or two pulses per day resulting so that the table would virtually stop in its arrested position until the gap short circuit condition ended.

The particular circuit provided by the present invention and the mode of its implementation through the divide-by-N stage and the gating arrangement provided makes it possible to stop the table feed and hold it in a virtually suspended mode of operation until gap short circuit condition ends. It is not necessary, as in other prior art circuits provided, to stop with a dead stop or to return and retrace the table through a previously traveled path until the gap short circuit condition is alleviated.

FIG. 3 is included in this application to show a different sensing network for gap voltage in which the input to the sensing network, that is through the opticoupling sensing network 112, is provided across the terminals A and C as shown in FIG. 2. In this case the changes in light intensity, which are a function of gap voltage, are communicated through the transistor 119 finally to control the conduction of the transistor 129 and hence the DC voltage input to the voltage controlled oscillator 99, again resulting in appropriate changes in its output pulse frequency.

The opticoupling network 112 of FIG. 3 is of particular advantage where different polarities of gap setting in several gaps are required due to different material combinations as between wire electrode and workpiece, or due to reversal of the wire electrode 76 and the workpiece 78 in their arrangement on the feed table. The differences in gap polarity in view of this arrangement do not affect the final control signal from the pulse generator, nor do they affect the mode in which it is transmitted.

It will thus be seen that we have provided by the present invention an improved servo feed system for electrical discharge machining which is particularly applicable to table movement control for a wire feed apparatus. It is significant that it is made possible by the control system to provide an actual table slowdown and, indeed, essentially a table stop within a very narrow voltage window so that the table movement will be arrested without really requiring the necessity for backup and retracing of the precut path after the voltage drop occurs.

An additional important feature of the present invention is that it is adaptable to the opticoupling principle so that there is required no direct connection between the control input to the voltage controlled oscillator and the gap, again so that the system operates independently of the gap polarity that may be preset.

We claim:

1. A servo feed system for an electrical discharge machining apparatus having a wire electrode and a workpiece whose relative movement is controlled by at least one electrically operated stepping motor, wherein the improvement comprises:

a voltage controlled oscillator having an input voltage from the gap representative of gap voltage and having connected to said motor a pulse output whose frequency is a function of the input voltage;

a divide-by-N stage operably connected between the output of said oscillator and the motor for predetermining a reduced frequency of pulses from said pulse output to be provided to said motor; and a network operably connected to said gap for enabling the divide-by-N stage to connect its reduced frequency of pulses to said motor responsive to gap short circuit condition.

2. The combination as set forth in claim 1 wherein a half-wave rectifier is operably connected to the input to said oscillator for making it responsive to voltage excursions of one polarity.

3. The combination as set forth in claim 2 wherein there is connected intermediate the input to said rectifier and the output from said gap an intermediate amplifier stage of the differential operating type.

4. The combination as set forth in claim 1 wherein there is coupled intermediate the input to said voltage controlled oscillator and said gap an opticoupling network for providing a voltage signal representative of gap voltage.

5. The combination as set forth in claim 4 wherein said opticoupling network includes a light emitting diode operably connected to the gap and a light responsive device having its output operably connected to said oscillator.

6. The combination as set forth in claim 5 wherein said opticoupling network includes said light emitting diode connected in parallel with a unilateral current conducting device for making said oscillator responsive to voltage excursions of one polarity.

7. The combination as set forth in claim 6 wherein there is further connected to said drive motor a gating means for decoupling the reduced frequency output of said divide-by-N stage from said motor responsive to gap voltage of substantially normal level, and further for coupling said reduced frequency output thereto responsive to gap voltage of abnormal level.

8. A servo feed control system for an electrical discharge machining apparatus comprising:
a wire electrode;
an incrementally operated electrical motor for regulating the relative position between said wire electrode and a workpiece during cutting;
a voltage controlled oscillator having an input operatively connected to the gap for sensing gap voltage and providing a first output normally connected to said motor in which the output pulse frequency is a function of the gap voltage;
a divider stage connected to the first output of said oscillator operable to provide a second output which represents a predetermined fraction thereof;
a cut-off stage having an input likewise coupled to the gap for providing a control pulse responsive to gap short circuit condition; and
a gating means initiated in its operation by said control pulse for disconnecting said first output from said motor and connecting the second output to said motor for the duration of said gap short circuit condition.

9. The combination as set forth in claim 8 wherein said gating means comprises an OR gate and a pair of AND gates, said first AND gate coupled between the output of said divider stage and one input terminal of said OR gate, the other of said AND gates coupled intermediate the output of said voltage controlled oscillator and the other input terminal of said OR gate, the first of said AND gates having its other respective input terminal operably connected to said cut-off state through an inverter, the second of said AND gates having its other respective input terminal directly connected to said cut-off stage and said OR gate having its output connected to said electrical motor.

10. The combination as set forth in claim 8 wherein said cut-off stage includes an amplifier field effect transistor operably connected to the gap.

11. The combination as set forth in claim 10 wherein there is further connected intermediate the gap and the input for said voltage controlled oscillator a half-wave rectifier for rendering the operation of said oscillator responsive to oscillations of a single polarity.

12. The combination as set forth in claim 8 wherein an opticoupling network is operably connected between said gap and the input to said voltage controlled oscillator.

13. The combination as set forth in claim 12 wherein said opticoupling network includes a diode operably connected across said gap and a light emitting diode connected across said diode.

14. The combination as set forth in claim 8 wherein said input to said voltage controlled oscillator includes a transistor having its base operably connected to one terminal of the gap and its emitter connected to said oscillator input through a differential amplifier stage.

15. A servo feed control system for an electrical discharge machining apparatus having a stationary path wire electrode comprising:
an incrementally operated electrical motor for regulating the position of a workpiece with respect to said wire electrode during cutting;
a voltage controlled oscillator having an input operatively connected to the gap for sensing gap voltage and providing a first output normally connected to said motor in which the output pulse frequency is a function of the gap voltage;
a divider stage connected to the first output of said oscillator and operable to provide a second output which represents a drastically reduced pulse frequency;
a cut-off stage having an input likewise coupled to the gap for providing a control pulse output responsive to gap short circuit condition; and
a gating means connected to said cut-off stage and initiated in its operation by said control pulse for disconnecting said first output from said motor and connecting said second output to said motor for the duration of said gap short circuit condition.

16. The combination as set forth in claim 15 wherein an opticoupling network is operably connected between said gap and the input to said voltage controlled oscillator.

17. The combination as set forth in claim 16 wherein said opticoupling network includes a diode operably connected across the gap, a light emitting diode connected across said diode, and a light responsive device operatively connected to said light emitting diode and to the input for said oscillator.

18. The combination as set forth in claim 15 wherein said gating means comprises an OR gate and a pair of AND gates, said first AND gate coupled between the output of said divider stage and one input terminal of said OR gate, the other of said AND gates coupled intermediate the output of said oscillator and the other input terminal of said OR gate, the first of said AND gates having its other respective input terminal operably connected to said cut-off stage through an inverter, the second of said AND gates having its other respective input terminal directly coupled to said cut-off stage, and said OR gate having its output connected to said electrical motor.

19. The combination as set forth in claim 15 wherein said input to said voltage controlled oscillator includes a transistor having its base operably connected to one terminal of the gap and its emitter connected to said oscillator input through an amplifier stage.

20. The combination as set forth in claim 15 wherein a half-wave rectifier is operably connected to the input of said oscillator for making it responsive to voltage excursions of one polarity only.

* * * * *